US012675551B2

(12) United States Patent
Nguyen et al.

(10) Patent No.: US 12,675,551 B2
(45) Date of Patent: Jul. 7, 2026

(54) CORRELATING REQUEST AND RESPONSE DATA USING SUPERVISED LEARNING

(71) Applicant: WORKDAY, INC., Pleasanton, CA (US)

(72) Inventors: Jeanette Nguyen, San Francisco, CA (US); Tim Lee, San Francisco, CA (US); Hesam Izakian, Calgary (CA); Dalmo Cirne, Boulder, CO (US)

(73) Assignee: WORKDAY, INC., Pleasanton, CA (US)

( * ) Notice: Subject to any disclaimer, the term of this patent is extended or adjusted under 35 U.S.C. 154(b) by 1108 days.

(21) Appl. No.: 17/695,180

(22) Filed: Mar. 15, 2022

(65) Prior Publication Data

US 2023/0297648 A1      Sep. 21, 2023

(51) Int. Cl.
*G06N 20/00*          (2019.01)
*G06F 18/21*          (2023.01)
*G06F 18/2115*        (2023.01)

(52) U.S. Cl.
CPC ...... *G06F 18/2115* (2023.01); *G06F 18/2185* (2023.01)

(58) Field of Classification Search
None
See application file for complete search history.

(56) References Cited

U.S. PATENT DOCUMENTS 10,664,527 B1 *  5/2020  Henderson .......... G06F 16/3347
12,322,500 B1 *  6/2025  Li ........................ G16H 40/20

* cited by examiner

*Primary Examiner* — David R Vincent
(74) *Attorney, Agent, or Firm* — James J. DeCarlo; Greenberg Traurig, LLP

(57)          ABSTRACT

The example embodiments relate to matching response data to request data. in an embodiment, a method includes retrieving a request and a plurality of responses; generating packed candidates based on the request and the plurality of responses, a given packed candidate in the packed candidates including the request and a subset of the plurality of responses; generating feature vectors corresponding to the packed candidates, a given feature vector in the feature vectors including at least one aggregated feature computed based on the request and one or more corresponding responses in a respective packed candidate; inputting the feature vectors into a machine learning (ML) model, the ML model configured to output predictions corresponding to the feature vectors; selecting a feature vector from the feature vectors based on the predictions; and storing responses associated with the optimal feature vector and the request in a data storage device.

14 Claims, 6 Drawing Sheets

CORRELATING REQUEST AND RESPONSE DATA USING SUPERVISED LEARNING

BACKGROUND

Many computing systems generate requests and receive responses to those requests. In many such systems, the format of requests can be ensured by server-side validations or similar techniques. However, in the same systems, the formats of requests can vary significantly. This variation can hamper the assignment of response data to request data.

DETAILED DESCRIPTION

Figure 1:
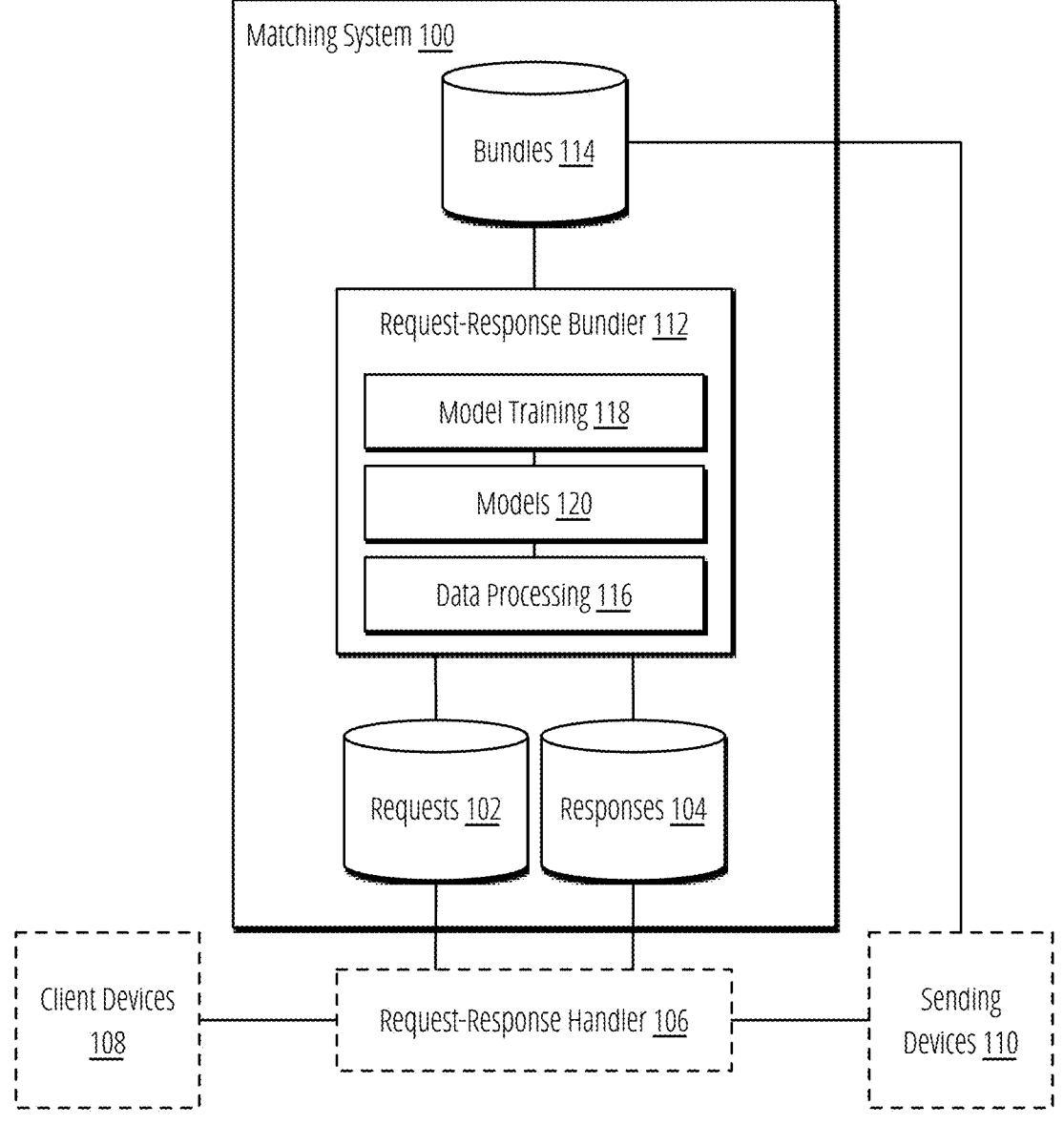
FIG. 1 is a block diagram illustrating a system for bundling request and response data according to some of the example embodiments.

To remedy the aforementioned problems in computing systems, the example embodiments describe a two-stage technique for matching response data to request data. In the various embodiments, a computing system can manage a set of requests generated through the computing system (or otherwise parsed by the computing system). The computing system can also receive response data from client devices. In the example embodiments, no substantial requirements are placed on fields in the response data. That is, the response data can be missing necessary data. Further, in the example embodiments, any given request can map to one or more responses.

To predict the mapping of requests to responses, the example embodiments utilize a two-stage approach. In the first stage, various conditions are applied to the universe of responses to obtain a smaller sample size of potential responses to map to a given request. Then, the example embodiments compute permutations of responses that potentially match a given request. In some embodiments, the number of permutations can be all possible permutations. However, in other embodiments, the number of permutations is limited by one or more thresholds that prevent excessive computation. Once the permutations are identified for a given request, the request and permutation of responses are converted into a feature vector representation using a variety of feature engineering techniques. The feature vector is then input into a machine learning (ML) model that predicts the likelihood of a given permutation of responses (represented as features) matching a given request (also represented as features). In some embodiments, the highest likelihood is used as a predicted mapping of a request to responses. In some embodiments, an additional step can be performed wherein the scored feature vectors are reconciled to ensure that there are no conflicts across permutations to guarantee exclusivity across requests. This predicted mapping can then be transmitted to a client device for review. In some embodiments, a user of the client device can either confirm or reject the predicted mapping. This confirmation or rejection can then be used as a label for continuously training the ML model.

The example embodiments provide numerous advantages over existing techniques. In many existing systems, manual review of requests and responses are employed to match such data. For example, electronic invoice-remittance systems often rely on human reviewers to identify mismatched remittances. Such systems suffer from numerous deficiencies. First, while some systems utilize business rules to attempt to match requests to responses, they fail to capture a non-trivial amount of data, thus requiring human intervention. Second, the sheer volume of data renders human matching of requests to all possible responses practically impossible. Third, even if a human reviewer could organize all possible permutations of responses, the accuracy of human reviewers in selecting the correct permutation is, at best, randomly successful. Specifically, the use of human review results in observational biases that result in incorrect permutations being selected. Further, any single reviewer cannot avail themselves of organization-wide knowledge of response formats and combinations. As such, human-based or human-in-the-loop techniques often result in mismatched data and incorrect results. The example embodiments remedy these inefficiencies by utilizing an ML model that is trained on historical patterns in request-response bundling. To reduce the computational expense, a bundling process is described, which enables the computation of high-value permutations that can be used to both train the ML model as well as predict high likelihood permutation matches.

FIG. 1 is a block diagram illustrating a system for bundling request and response data according to some of the example embodiments.

In an embodiment, matching system 100 includes a request datastore 102 and response datastore 104. In an embodiment, the request datastore 102 and response datastore 104 can include databases such as relational databases, NoSQL databases, key-value databases, etc. In other embodiments, request datastore 102 and response datastore 104 can include other types of data stores such as big data storage systems, flat files, etc. The request datastore 102 can store requests issued to client devices 108. The specific form of a request is not limiting. As one example, a request can include an invoice issued to a client. A request can include various data fields. Continuing the example of an invoice, the request can include a customer name, a customer identifier, an invoice amount, a description of services or goods, banking details (e.g., account or routing numbers), third-party information (e.g., reference numbers), an intended ration distribution for payment amounts, or similar types of data. In some embodiments, a request can include a unique identifier that identifies the request in request datastore 102. Continuing the example of an invoice, the request can include a unique invoice identifier generated by the matching system 100 (e.g., a globally unique identifier, GUID). In some embodiments, matching system 100 can manage the generation of unique identifiers. In other embodiments, a third party can generate the unique identifiers.

In an embodiment, sending devices 110 can generate requests via a request and response handler 106. The specific operations of generating a request are not limited herein, and any system capable of generating requests and storing such requests in request datastore 102 can be used. Continuing the example of an invoice, sending devices 110 can interact with request and response handler 106 to generate invoices (e.g., populate fields of an invoice). The request and response handler 106 can then store the invoice in request datastore 102 and transmit the invoice to client devices 108.

Further, the request and response handler 106 can receive responses from client devices 108. The request and response handler 106 can write responses to response datastore 104 for future processing (discussed further herein). In an embodiment, the responses can comprise electronic responses (e.g., electronic payments). In some embodiments, responses can also include various data fields. However, as will be discussed, in some embodiments, the responses can be variable in their data fields. That is, some responses may include fewer or more data fields than other responses. Further, in some embodiments, the responses can be non-electronically generated. For example, the responses can include digital images of paper responses. In this example, the responses can be converted into electronic responses via, for example, optical character recognition (OCR), courtesy amount recognition (CAR), legal amount recognition (LAR), or similar types of analog-to-digital conversions. As such, in some embodiments, the responses can include corrupted or unintelligible data.

In some embodiments, the request and response handler 106 can be configured to write all responses to response datastore 104 without substantive processing (beyond analog-to-digital processing, described above). That is, the response datastore 104 can be configured as a sink of all raw response data. For example, the request and response handler 106 can be configured to perform matching between unique identifiers in responses and requests. For example, a response may include a unique identifier of a request (e.g., an invoice number). In this case, the request and response handler 106 can automatically bundle the request and response(s) based on the unique identifier. However, as will be discussed, this matching can be performed by matching system 100 to reduce the complexity of request and response handler 106 and separate processing concerns of matching system 100.

In an embodiment, matching system 100 includes a request-response bundler 112. The description of FIG. 2 describes the request-response bundler 112 in more detail, and that description is not repeated herein but is only summarized for the sake of clarity. In brief, the request-response bundler 112 includes models 120 that automatically matches responses to requests. In some embodiments, after performing matching based on unique identifiers or similarly reliable data fields, the request-response bundler 112 can process all remaining requests and responses that have not been matched.

A data processing stage 116 of request-response bundler 112 can be configured to read requests and responses from request datastore 102 and response datastore 104. The data processing stage 116 can then pre-process the requests and responses to obtain input examples for models 120. In some embodiments, the data processing stage 116 can be configured to perform the initial matching based on, for example, unique identifiers as described previously. The data processing stage 116 can also be configured to generate a plurality of permutations of a request and one or more responses. Continuing the invoice example, during this step, the data processing stage 116 can group permutations of payments where the aggregate payment amount matches an invoice amount in a request. In some embodiments, the data processing stage 116 can then further perform feature engineering on the permutations to generate a final input example to supply to models 120.

In an embodiment, models 120 can include one or more machine learning (ML) models. The following description uses a single model to describe the matching system 100; however, multiple models (e.g., using a stacking ensemble or similar approach) can also be implemented. As discussed with respect to data processing stage 116, the input to the ML model comprises a permutation including one or more request and one or more responses. In some embodiments, the ML model can include a gradient-boosted tree algorithm such as an XGBoost model. In some embodiments, the models 120 can be trained during a model training phase 118. In some embodiments, the model training phase 118 can comprise using human-labeled bundles of a request and one or more responses as training data. In some embodiments, the model training phase 118 can include using automatically matched request-response bundles as training data. In some embodiments, the models 120 are trained on a per-customer basis. That is, a single entity generating requests includes a dedicated model. Thus, the models 120 can include multiple independent models for each user of the matching system 100. In some embodiments, the models 120 can be independently trained based on other verticals. For example, a division of a company can include its own model in models 120. As another example, a specific request format can be associated with its own model in models 120.

In an embodiment, during prediction, the permutations of request-responses are input into models 120, and the predictions of the models 120 are stored in a bundles datastore 114. In an embodiment, the bundles datastore 114 can include a database such as a relational database, NoSQL database, key-value database, etc. In other embodiments, the bundles datastore 114 can include other types of data stores such as big data storage systems, flat files, etc. In some embodiments, the output of models 120 comprises a permutation predicted as the most likely. That is, the models 120 can output, for each request, a set of responses likely to match the request. This permutation and the associate request are written to bundles datastore 114. In an embodiment, the devices 110 can access the bundles datastore 114 (e.g., via a web interface, mobile application, desktop application, etc.). In some embodiments, devices 110 can review a given request and response permutation and either accept or reject the permutation. In this embodiment, the result of the review (e.g., accept or reject) can be used to update the training data used by model training phase 118. In some embodiments, the matching system 100 can be configured to continuously retrain the models 120 based on the reviews from devices 110.

Figure 2:
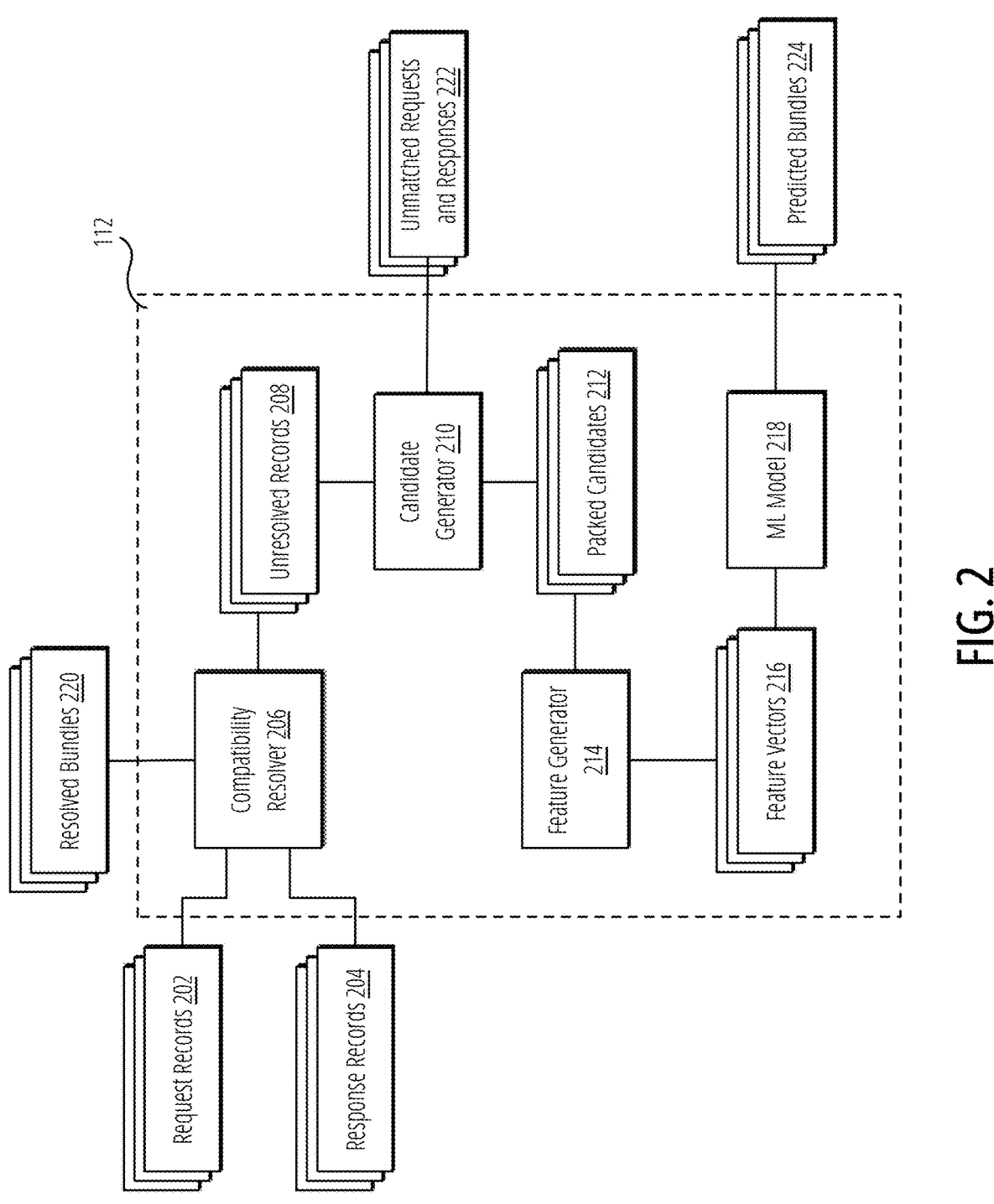
FIG. 2 is a block diagram of a request-response bundler according to some of the example embodiments.

FIG. 2 is a block diagram of a request-response bundler according to some of the example embodiments.

In an embodiment, the request-response bundler 112 receives request records 202 and response records 204 and generates predicted bundles 224 for corresponding requests. In some embodiments, an additional step can be performed wherein the scored predicted bundles 224 are reconciled to ensure that there are no conflicts across permutations to guarantee exclusivity across requests. In an embodiment, the request-response bundler 112 can retrieve the request records 202 from the request datastore 102, while request-response bundler 112 can retrieve the response records 204 from the response datastore 104. Details of request records and response records were provided in the description of FIG. 1 and are not repeated herein.

The request-response bundler 112 can include a compatibility resolver 206 that receives the request records 202 and response records 204 from the request datastore 102 and response datastore 104, respectively. In an embodiment, the compatibility resolver 206 generates resolved bundles 220 and unresolved records 208. In an embodiment, the compatibility resolver 206 can generate resolved bundles 220 by performing an explicit matching operation on the request records 202 and response records 204. For example, in an embodiment, the compatibility resolver 206 can determine if a field in a request record is present in one or more response records. One example of such a field is a unique identifier (e.g., an invoice number) common to both a request record and one or more response records. Other types of common fields can be used. In some embodiments, the field can be extracted from a dedicated location on the request and/or response records. In other embodiments, the field can be extracted from the request and then responses can be searched for a matching field. For example, since a request record may be generated by the matching system 100 (as described previously), the matching system 100 can quickly extract this field (e.g., by selecting a field of a database row). However, the response records may be unstructured and thus, the compatibility resolver 206 can analyze the content of each request to determine if any requests include the field. For example, if the responses are digitized (e.g., via OCR) remittances, the compatibility resolver 206 can perform a search of the text content to determine if the field value (e.g., invoice number) is present in the remittance. When the compatibility resolver 206 is able to identify a clear mapping between a request and one or more responses, the compatibility resolver 206 can output the resolved bundles 220 to a database (e.g., bundles datastore 114) and remove the records in the resolved bundles 220 from further processing. Thus, compatibility resolver 206 can operate to reduce the workload of downstream processing elements for easily matched request-responses pairs.

In some embodiments, the compatibility resolver 206 can also further be configured to eliminate hard conflicts between requests and responses. In some embodiments, the compatibility resolver 206 may utilize hard-coded rules, while in other embodiments, the compatibility resolver 206 can use rules formulated based off of training data as well. For example, some fields in requests and responses may be limited to certain enumerated options. As one specific example, a request may include a recipient name. The responses may or may not include the recipient name or may include other recipient names. In an embodiment, the compatibility resolver 206 can perform a pre-grouping that ensures that downstream processing elements only operate on valid combinations of requests and responses. Thus, a given request can preliminarily be associated with all responses that do not include a hard conflict. Continuing this example, if a request includes "Customer A" as a recipient, only responses that include "Customer A" or omit any recipient detail can be preliminary associated with the request, and all responses including "Customer B" or other types of customers can be excluded from consideration for the request. Thus, the compatibility resolver 206 can impose restrictions that remove request-response pairs that are unlikely or cannot be matched. These restrictions can be learned or formulated based off training data as well. A similar type of preliminary grouping can be done for other fields such as a currency type (i.e., responses must be in the same currency as a request) or legal entity (i.e., grouping subsidiaries under a single company entity). In some embodiments, these preliminary groupings can be combined to further narrow the set of potential responses for each given request.

In an embodiment, the compatibility resolver 206 outputs unresolved records 208 to a candidate generator 210. As discussed, the unresolved records 208 can comprise a set of requests and a set of preliminary group responses. The following description does not emphasize the preliminary grouping of responses, however the "responses" for a given request in the following description can refer to either the preliminary grouped responses by compatibility resolver 206 or all responses (if, in some embodiments, no preliminary grouping is performed).

In an embodiment, the candidate generator 210 receives requests and a set of responses potentially matching that request. As discussed, this set of responses can include all responses in response records 204 (less the responses included in resolved bundles 220) or can include a set of preliminary group responses that satisfy hard conflict rules. The candidate generator 210 is configured to generate a set of packed candidates 212. As used herein, a packed candidate refers to a combination of request and one or more responses that satisfy a condition of the request. As one example, this condition can comprise that the total (e.g., summation) payment amount included in the responses matches the invoice amount in a request. Other types of conditions can be employed. In some embodiments, the candidate generator 210 can iterate through all possible combinations of response records included in unresolved records 208. In some embodiments, the preliminary grouping performed by compatibility resolver 206 reduces the universe of potential responses for a given request and thus makes iteration through all permutations computationally feasible.

In some embodiments, the candidate generator 210 can pre-sort the potential responses for a given request (e.g., in descending order) and process responses in order. For example, a highest payment amount can first be selected then other payment amounts can be used to reach the invoice amount in a request. In some embodiments, the candidate generator 210 can implement strategies or optimizations to efficiently rule out potential responses by features. For example, if the smallest invoice is too large for the largest payment, no combination will make the two equal. For all others, the candidate generator 210 may increase the speed of the search by skipping permutations. For example, given a target of $100, and given a response set of [$1, $5, $99, $1,000], any permutations including the last item may be skipped because it will be larger than $100.

In some embodiments, the responses can form a long-tail distribution based on a field used to compute permutations (e.g., a payment field). That is, a few responses will have payment values close to the request invoice amount. In this scenario, the responses closest to matching the request can be inspected first to generate permutations. In some scenarios, the candidate generator 210 can employed a maximum permutation value or threshold to limit the processing to a specific number of permutations. This ensures that the candidate generator 210 does not generate permutations for an unbounded number of times.

To illustrate the above functionality, the following example of invoices and remittances is provided. In this example, the request may include an invoice amount of $100 while the responses include payment amounts of:

TABLE 1

| | |
|---|---|
| A | $99 |
| B | $95 |
| C | $ 5 |
| D | $ 3 |
| E | $ 1 |

TABLE 1-continued

| | |
|---|---|
| F | $1 |
| G | $1 |

In this example, the following permutations are valid: AE, AF, AG, BC, BDEF, BDEG, and BDFG. This list can be computed by selecting A first, and matching all possible combinations that sum to $100, the selecting B and matching all possible combinations that sum to $100. In this example, if the maximum permutation value is set to five, the candidate generator 210 would return only AE, AF, AG, and BC, thus bounding the computation time of the candidate generator 210. Certainly, the maximum permutation value can be set based on the needs of the system. For example, other factors such as dates between request and responses, comments, remittance information or similar data can be used to validate the permutations.

Alternatively, or in conjunction with the foregoing, the candidate generator 210 can specify a maximum permutation size. As used herein, a maximum permutation size refers to a maximum total number of responses that can be matched to a request. For example, the candidate generator 210 can limit the number of responses to match with a request to five. As another example, if candidate generator 210 sets a maximum permutation size of two for the responses in Table 1 candidate generator 210 would return only AE, AF, AG, and BC.

As illustrated, the candidate generator 210 can also output a set of unmatched requests and responses 222. In an embodiment, the unmatched request and responses 222 comprise all requests and responses that were not matched using the above-described process. In some embodiments, the unmatched request and responses 222 can be stored for manual review, auditing, etc.

In an embodiment, the candidate generator 210 transmits the packed candidates 212 to a feature generator 214. As discussed above, each packed candidate is of the form {X, $Y_1$, $Y_2$, . . . $Y_n$} where X represents the request and $Y_i$ represents a response, and n represents a parameter to constrain the maximum number of suggestions. Both include a variety of fields. In an embodiment, the feature generator 214 converts the request and responses into a feature vector suitable for classification. Thus, feature generator 214 converts the packed candidates 212 into feature vectors 216. In some embodiments, the feature generator 214 extracts fields from the request and responses for a given packed candidate and creates a feature vector from these fields. Alternatively, or in conjunction with the foregoing, the feature generator 214 can synthesize new features based on the fields of the given packed candidate. Thus, a given feature vector can include a combination of raw features and synthesized features. Details of synthesizing features (i.e., feature engineering) are described below.

For a given packed candidate, various synthesized features can be computed. The examples given here are some, but not all, such features. A first feature can include a request to response ratio that can be computed. A second feature can include an average time between sending a request and receiving a response (e.g., payment). For this feature, both the request and responses can be associated with a date field. The second feature is computed by calculating the temporal differences between each response and the request and then averaging the differences to obtain an average difference. Alternatively, or in conjunction with the foregoing, the maximum, minimum, median, or other aggregate measures can be used to compute the second feature. In some embodiments, the temporal distances between each response and request can all be included as features. A third feature can include the total number of responses in the packed candidate. A fourth feature can include a ranking of responses based on their closeness to a field in the request. For example, if the request includes an invoice amount and each response includes its own payment amount, the responses can be ranked based on their percentage of the invoice amount in the request. A fifth feature can comprise ranking responses based on their temporal closeness to a request. A sixth feature can comprise counts of how many times each response is included in a set of packed candidates (i.e., the appearance frequency of response in a given period). In some embodiments, the sixth feature can be computed over a fixed time period (e.g., one month) to ensure consistency.

A seventh feature can include a count, for each response, of the number of occurrences of a known pattern. For example, in some scenarios, a given response can include multiple payments and can thus include multiple serial numbers or other indicia. In some embodiments, these indicia can follow defined patterns (e.g., YYYY-NNNNNN, where YYYY comprises a year and NNNNNN comprises a six-digit number). In some embodiments, the seventh feature can be a count of the number of times data matching this pattern appears in a given response.

An eighth feature can include a normalized entity name. In some embodiments, responses can include variations of an entity name (e.g., regional entities, departments, shortened names, etc.). In some embodiments, a graph of entity names and their similarities can be continuously updated and responses can be analyzed to determine if a common entity name is used on the responses. If so, the common name can be used as the eighth feature. In some embodiments, the eighth feature can be a list of entity names computed using the above process and the number of occurrences of the entity names. In some embodiments, a text similarity algorithm (e.g., Latent Dirichlet Allocation) can be used to compute similarities between entity names.

In some embodiments, the above features (and others) can be used as the features representing the responses and combined with fields of the request. In some embodiments, the features (and others) can be used as the entire feature vector for a given packed candidate. In some embodiments, the feature generator 214 can store indicia that maintains the original correspondence between a request and responses. Thus, if the feature vector includes only aggregate features, the indicia can be used to "rebuild" the packed candidate after classification by the ML model 218.

In the embodiments, the feature generator 214 is used during both training and prediction to generate feature vectors having the same dimensionality for both stages. Specifically, as discussed above, a packed candidate can be labeled as accurate or inaccurate (e.g., by a human editor). The labeled packed candidate can be passed through feature generator 214 to generate a feature vector and used as a training example.

In an embodiment, the request-response bundler 112 is configured to input feature vectors 216 into the ML model 218. In some embodiments, the ML model 218 can comprise a decision tree-based model. In some embodiments, the ML model 218 can comprise a gradient-boosted decision tree. In some embodiments, the ML model 218 can comprise an XGBoost model or a similar type of model. In some embodiments, an XGBoost model can be trained using a grid search (e.g., randomized grid search) approach during training. As discussed above, in some embodiments, previously generated packed candidates, which are labeled by human users can be used as training data. Alternatively, or in conjunction with the foregoing, the predicted bundles 224 can also be used as training data. In an embodiment, the ML model 218 generates a score or probability for each of the feature vectors 216. In general, the score generated by the ML model 218 represents the likelihood that a given packed candidate (represented by a feature vector) accurately bundles responses with a request.

As discussed above, in some embodiments, for each request, a number of feature vectors 216 are input into the ML model 218 and thus a number of scores for the feature vectors 216 are generated. As such, in an embodiment, the request-response bundler 112 is configured to sort the feature vectors 216 for a given response based on their predicted score. In some embodiments, the request-response bundler 112 can then output predicted bundles 224 for a plurality of requests. In an embodiment, the request-response bundler 112 will output one bundle (i.e., request and responses) for any given request along with the predicted score. In some embodiments, the request-response bundler 112 can alternatively output all bundles for each request along with a score. As discussed above, the highest-scoring bundle for a given request can be provided to a human reviewer who can approve or reject the bundle, thus generating training data.

Figure 3:
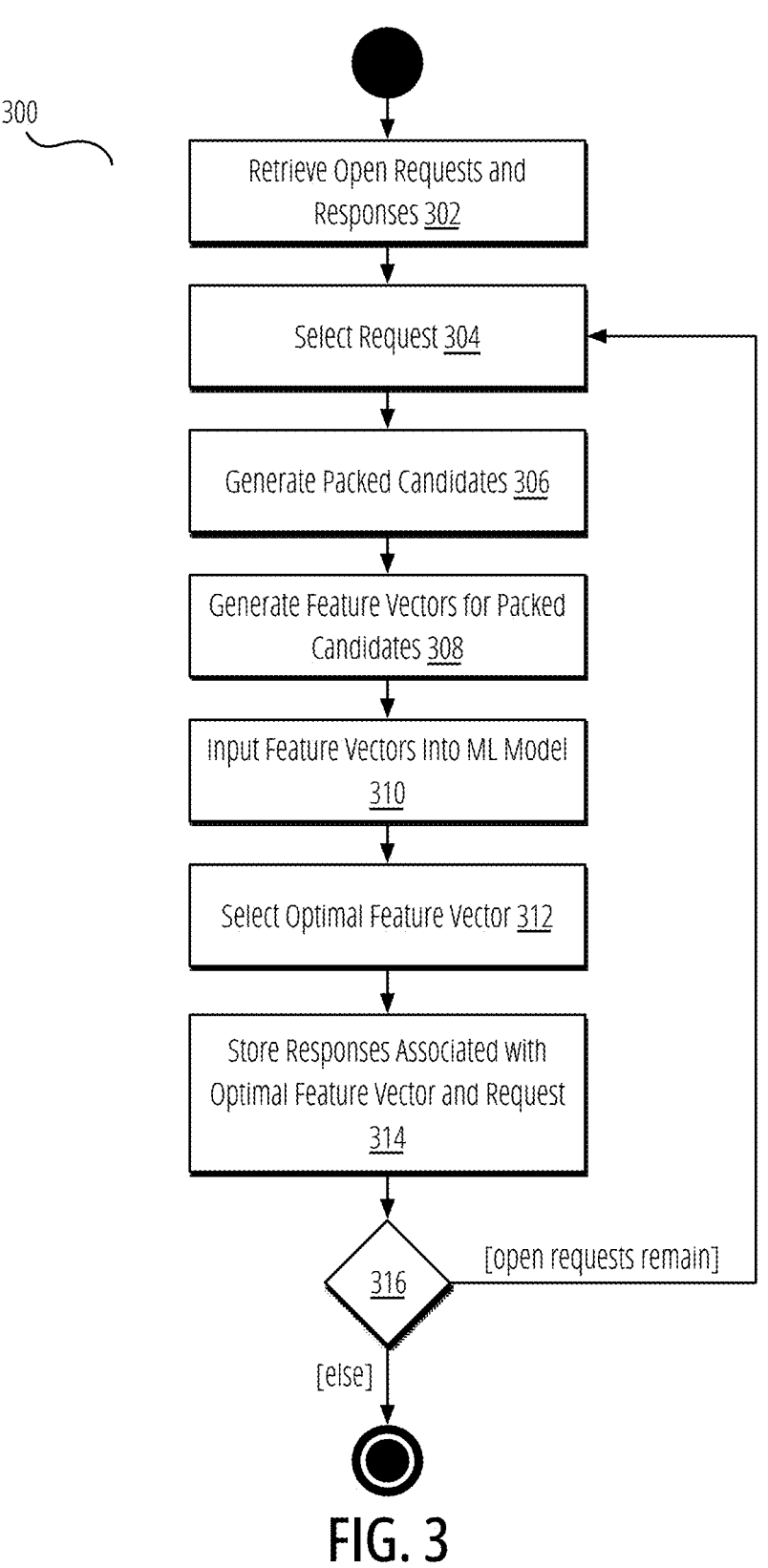
FIG. 3 is a flow diagram illustrating a method for bundling request and response data according to some of the example embodiments.

FIG. 3 is a flow diagram illustrating a method for bundling request and response data according to some of the example embodiments.

In step 302, method 300 can include retrieving open requests and responses. As used herein, open requests and responses refer to requests and responses (discussed above) that have not yet been successfully bundled using, for example, method 300.

In step 304, method 300 can include selecting a given request from the open requests. The specific order in which requests are selected should not limit the embodiments. As illustrated, method 300 will execute numerous steps and, in step 316, determines if all open requests have been processed. If not, method 300 re-executes for each open request. Once all open requests have been processed, method 300 can end. The following steps are described with respect to any given open request. In some embodiments, after step 304, method 300 can include a step of filtering the number of potential responses, as described more fully in the description of FIG. 4.

Figure 4:
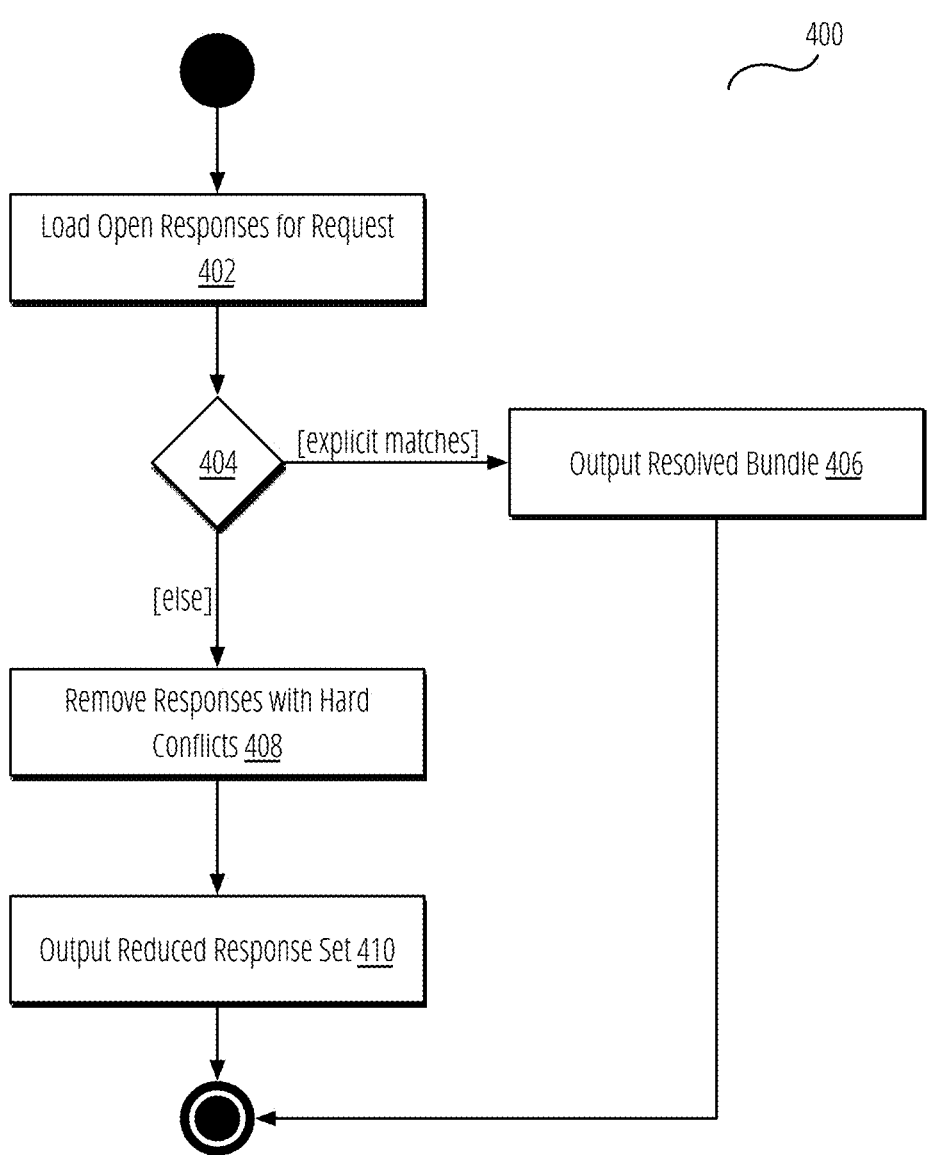
FIG. 4 is a flow diagram illustrating a method for filtering responses for a given request according to some of the example embodiments.

FIG. 4 is a flow diagram illustrating a method for filtering responses for a given request according to some of the example embodiments.

In step 402, method 400 can include loading all open responses for a given request. In some embodiments, all open responses can include those responses that have not yet been bundled with a request using method 300.

In step 404, method 400 can include identifying any explicit matches between the given request and the open responses. In some embodiments, step 404 may utilize hard-coded rules, while in other embodiments, step 404 can use rules formulated based off of training data as well.

In an embodiment, method 400 can determine if a field in the given request is present in the responses. One example of such a field is a unique identifier (e.g., an invoice number) common to both a request record and one or more response records. Other types of common fields can be used. In some embodiments, the field can be extracted from a dedicated location on the request and/or response records. In other embodiments, the field can be extracted from the request and then responses can be searched for a matching field. For example, since a request record may be generated by a matching system (e.g., matching system 100), the matching system can quickly extract this field (e.g., by selecting a field of a database row). However, the response records may be unstructured and thus, method 400 can analyze the content of each request to determine if any requests include the field. For example, if the responses are digitized (e.g., via OCR) remittances, method 400 can perform a search of the text content to determine if the field value (e.g., invoice number) is present in the remittance. When method 400 is able to identify a clear mapping between a request and one or more responses, method 400 can output resolved bundles to a database or data storage device and remove the records from further processing in step 406.

In some embodiments, step 404 can further include determining if the matching responses completely satisfy a condition of the given request. For example, the given request may include a total value. In this scenario, method 400 can further determine if a total value obtained by summing individual values of matching responses is equal to the total value of the given request. If not, method 400 may proceed to step 408.

In step 408, method 400 can include removing any responses that have a hard conflict with the given request.

In an embodiment, some fields in the given request and the responses may be limited to certain enumerated options. As one specific example, a request may include a recipient name. The responses may or may not include the recipient's name or may include other recipient names. In an embodiment, method 400 can perform a pre-grouping that ensures that downstream processing elements only operate on valid combinations of requests and responses. Thus, a given request can preliminarily be associated with all responses that do not include a hard conflict. Continuing this example, if a request includes "Customer A" as a recipient, only responses that include "Customer A" or omit any recipient detail can be preliminary associated with the request, and all responses including "Customer B," or other types of customers can be excluded from consideration for the request. A similar type of preliminary grouping can be done for other fields such as a currency type (i.e., responses must be in the same currency as a request) or legal entity (i.e., grouping subsidiaries under a single company entity). In some embodiments, these preliminary groupings can be combined to further narrow the set of potential responses for each given request.

In step 410, method 400 can include outputting unresolved records (e.g., the given request and any remaining responses). As discussed, the unresolved records can comprise a set of requests and a set of preliminary group responses.

Returning to FIG. 3, in step 306, method 300 can include generating packed candidates based on the request selected in step 304 and the remaining open responses (e.g., those remaining after method 400 executes). In an embodiment, a given packed candidate in the packed candidates includes the selected request and a subset of the plurality of responses.

In an embodiment, method 300 receives requests and a set of responses potentially matching that request. As discussed, this set of responses can include all responses in response records or can include a set of preliminary group responses that satisfy hard conflict rules (as discussed in FIG. 4). As discussed previously, a packed candidate refers to a combination of a request and one or more responses that satisfy a condition of the request. As one example, this condition can comprise that the total (e.g., summation) payment amount included in the responses matches the invoice amount requested in a request. Other types of conditions can be employed. In some embodiments, method 300 can iterate through all possible combinations of response records included in the unresolved records. In some embodiments, the preliminary grouping performed by method 400 reduces the universe of potential responses for a given request and thus makes iteration through all permutations computationally feasible by reducing the computational power needed by method 400.

In some embodiments, method 300 can pre-sort the potential responses for a given request (e.g., in descending order) and process responses in order. For example, a highest payment amount can first be selected then other payment amounts can be used to reach the invoice amount in a request. In some embodiments, the responses can form a long-tail distribution based on a field used to compute permutations (e.g., payment). That is, a few responses will have payment values close to the request invoice amount. In this scenario, the responses closest to matching the request can be inspected first to generate permutations. In some scenarios, method 300 can employ a maximum permutation value or threshold to limit the processing to a specific number of permutations. This ensures that method 300 does not generate permutations for an unbounded number of times.

Alternatively, or in conjunction with the foregoing, method 300 can specify a maximum permutation size. As used herein, a maximum permutation size refers to a maximum total number of responses that can be matched to a request. For example, method 300 can limit the number of responses to match with a request to five.

In some embodiments, method 300 can also output a set of unmatched requests and responses. In an embodiment, the unmatched request and responses comprise all requests and responses that were not matched using the above-described process. In some embodiments, the unmatched request and responses can be stored for manual review, auditing, etc.

In step 308, method 300 can include generating feature vectors corresponding to the packed candidates. In an embodiment, any given feature vector includes at least one aggregated feature computed based on the request selected in step 304 and one or more corresponding responses in a respective packed candidate.

In an embodiment, method 300 can convert the request and responses into a feature vector suitable for classification. In some embodiments, method 300 can extract fields from the request and responses for a given packed candidate and create a feature vector from these fields. Alternatively, or in conjunction with the foregoing, method 300 can synthesize new features based on the fields of the given packed candidate. Thus, a given feature vector can include a combination of raw features and synthesized features. Various details regarding synthesized features (i.e., the first through eight features) were previously discussed in the description of FIG. 2 and are not repeated herein. In some embodiments, the features (and others) can be used as the features representing the responses and combined with fields of the request. In some embodiments, the features (and others) can be used as the entire feature vector for a given packed candidate. In some embodiments, method 300 can store indicia that maintains the original correspondence between a request and responses. Thus, if the feature vector includes only aggregate features, the indicia can be used to "rebuild" the packed candidate after classification by an ML model or classifier.

In step 310, method 300 can include inputting the feature vectors into an ML model configured to output predictions corresponding to the feature vectors.

In some embodiments, the ML model can comprise a decision tree-based model. In some embodiments, the ML model can comprise a gradient-boosting decision tree. In some embodiments, the ML model can comprise an XGBoost model, or a similar type of model. In some embodiments, an XGBoost model can be trained using a grid search (e.g., randomized grid search) approach during training. As discussed above, in some embodiments, previously generated packed candidates which are labeled by human users can be used as training data. Alternatively, or in conjunction with the foregoing, the predicted bundles can also be used as training data. In an embodiment, the ML model generates a score or probability for each of the feature vectors. In general, the score generated by the ML model represents the likelihood that a given packed candidate (represented by a feature vector) accurately bundles responses with a request.

In step 312, method 300 can include selecting an optimal feature vector from the feature vectors based on the predictions.

As discussed above, in some embodiments, for each request, a number of feature vectors are input into the ML model and thus a number of scores for the feature vectors are generated. As such, in an embodiment, method 300 can sort the feature vectors for a given response based on their predicted score. In some embodiments, an additional step can be performed wherein method 300 can ensure that multiple high-ranking features can be selected by reconciling the feature vectors to ensure there is over-budgeting of responses, (e.g., that the invoice is not matched in a way that it exceeds the remaining invoice amount). Method 300 can then select the highest-ranking feature vector based on the sorted list. In some embodiments, method 300 can then use indicia in the feature vector to load the underlying responses used to generate the feature vector.

In step 314, method 300 can include storing responses associated with the optimal feature vector and the request in a data storage device.

In some embodiments, method 300 can output predicted bundles for a plurality of requests to a data storage device (e.g., database, filesystem, etc.). In an embodiment, method 300 can output one bundle (i.e., request and responses) for any given request along with the predicted score. In some embodiments, method 300 can alternatively output all bundles for each request along with a score. As discussed above, the highest-scoring bundle for a given request can be provided to a human reviewer who can approve or reject the bundle, thus generating training data. In some embodiments, method 300 can further include removing the selected responses from the corpus of open responses, thus further limiting the number of open responses analyzed in step 306.

Figure 5:
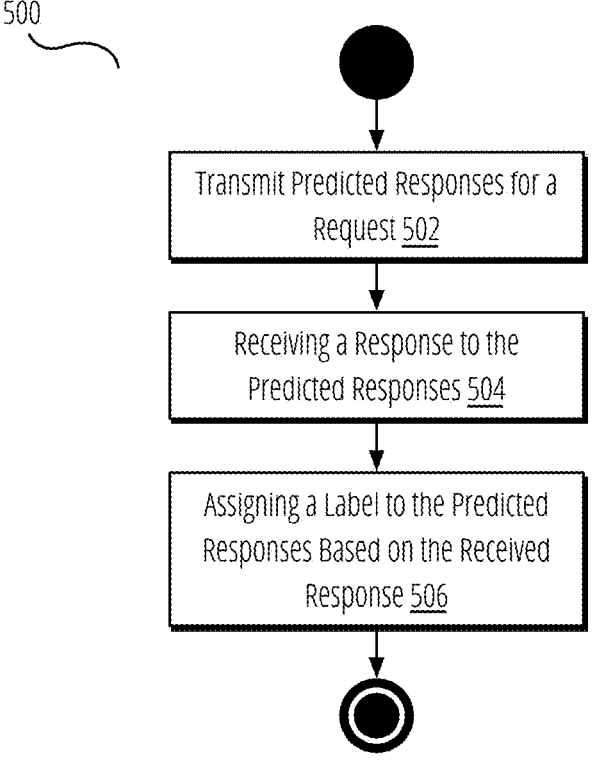
FIG. 5 is a flow diagram illustrating a training data generation procedure according to some of the example embodiments.

FIG. 5 is a flow diagram illustrating a training data generation procedure according to some of the example embodiments.

In step 502, method 500 can include transmitting predicted responses for a given request to a user. In an embodiment, the predicted responses can be generated using method 300 as described previous and not repeated herein. For example, a web page or mobile application can display an open request and then list the predicted responses. In some embodiments, method 500 can include providing the underlying features used to classify the predicted responses and open request.

In step 504, method 500 can include receiving a response to the predicted responses. In some embodiments, the response received in step 504 can comprise a confirmation and/or rejection. In some embodiments, a confirmation indicates that the predicted responses correspond completely to the given request. By contrast, a rejection indicates one or more responses should not be associated with a given request.

In step 506, method 500 can include assigning a label to the predicted responses based on the response received in step 504. In some embodiments, method 500 can include assigning a positive label if a confirmation is received and a negative label if a rejection is received. In some embodiments, the labels can be stored as training data in a training data set. In some embodiments, method 500 can store feature vectors corresponding to the request and predicted responses transmitted in step 502 in a temporary storage location and, upon adding the label, can store the labeled feature vectors to a training data set. As described previously, the training data set can be used to continuously retrain the ML model.

Figure 6:
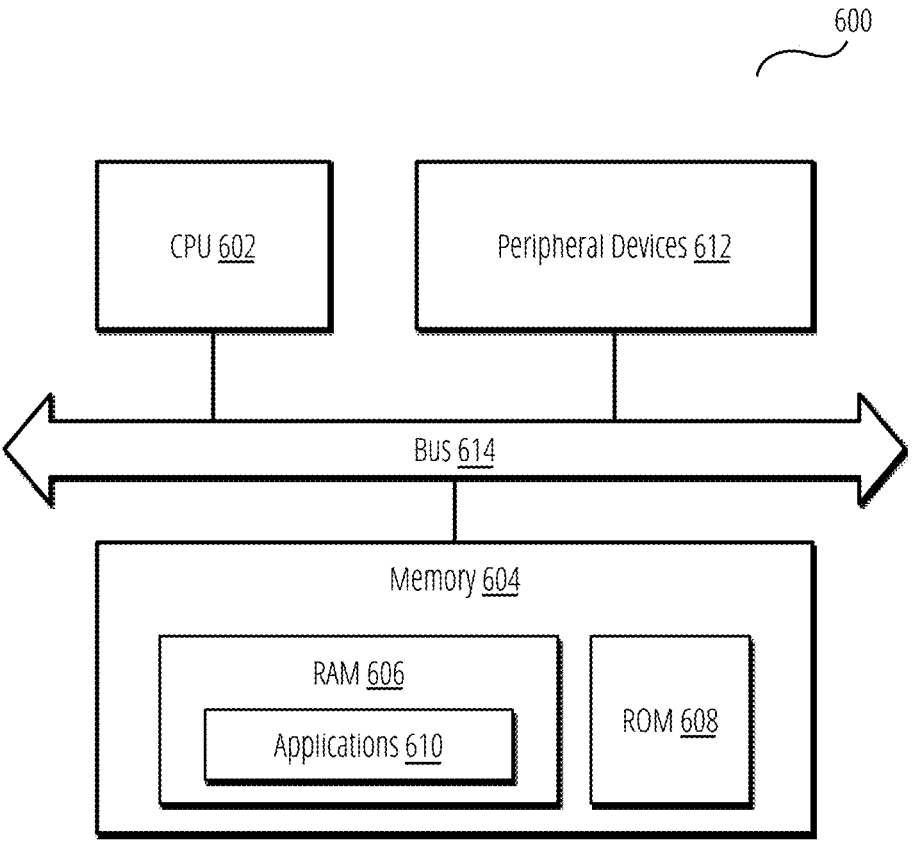
FIG. 6 is a block diagram of a computing device 600 according to some embodiments of the disclosure.

FIG. 6 is a block diagram of a computing device 600 according to some embodiments of the disclosure. In some embodiments, the computing device can be used to perform some of all of the methods described above or implement the components depicted in the previous figures.

As illustrated, the device includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a non-transitory memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, bus 614 may comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth™, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   retrieving, by a processor, a request and a plurality of responses;

filtering, by the processor, the plurality of responses by removing responses having a field value that conflicts with a corresponding field value of the request;

generating, by the processor, packed candidates based on the request and the plurality of responses remaining after the filtering by iteratively computing permutations of responses from the plurality of responses until reaching a threshold number of permutations, a given packed candidate in the packed candidates comprising the request and a subset of the plurality of responses, wherein an aggregate value computed from a numerical field of the responses in the subset satisfies a condition of the request;

generating, by the processor, feature vectors corresponding to the packed candidates, a given feature vector in the feature vectors including at least one synthesized feature computed from fields of both the request and one or more corresponding responses in a respective packed candidate, the at least one synthesized feature comprising a computed temporal difference between a date associated with the request and dates associated with the one or more corresponding responses;

inputting, by the processor, the feature vectors into a machine learning (ML) model trained on previously labeled packed candidates, the ML model configured to output, for each of the feature vectors, a score representing a likelihood that the respective packed candidate accurately bundles the one or more corresponding responses with the request;

selecting, by the processor, a feature vector from the feature vectors having a highest score from the scores output by the ML model; and storing, by the processor, responses associated with the feature vector and the request in a data storage device.

2. The method of claim 1, wherein generating the packed candidates comprises: matching a subset of responses to the request based on a matching rule; and excluding the request and the subset of responses when generating the packed candidates.

3. The method of claim 1, wherein computing permutations of responses from the plurality of responses comprises computing permutations less than a fixed permutation size.

4. The method of claim 1, wherein inputting the feature vectors into the ML model comprises inputting the feature vectors into a gradient-boosted decision tree.

5. The method of claim 1, further comprising: transmitting the responses associated with the feature vector and the request to a user; receiving a response from the user, the response comprising one of a confirmation or rejection of the responses associated with the feature vector and the request; and using the response as a label during training of the ML model.

6. A non-transitory computer readable storage medium for tangibly storing computer program instructions capable of being executed by a computer processor, the computer program instructions defining steps of:

retrieving a request and a plurality of responses;

filtering the plurality of responses by removing responses having a field value that conflicts with a corresponding field value of the request;

generating packed candidates based on the request and the plurality of responses remaining after the filtering by iteratively computing permutations of responses from the plurality of responses until reaching a threshold number of permutations, a given packed candidate in the packed candidates comprising the request and a subset of the plurality of responses, wherein an aggregate value computed from a numerical field of the responses in the subset satisfies a condition of the request;

generating feature vectors corresponding to the packed candidates, a given feature vector in the feature vectors including at least one synthesized feature computed from fields of both the request and one or more corresponding responses in a respective packed candidate, the at least one synthesized feature comprising a computed temporal difference between a date associated with the request and dates associated with the one or more corresponding responses;

inputting the feature vectors into a machine learning (ML) model trained on previously labeled packed candidates, the ML model configured to output, for each of the feature vectors, a score representing a likelihood that the respective packed candidate accurately bundles the one or more corresponding responses with the request;

selecting a feature vector from the feature vectors having a highest score from the scores output by the ML model; and storing responses associated with the feature vector and the request in a data storage device.

7. The non-transitory computer readable storage medium of claim 6, wherein generating the packed candidates comprises: matching a subset of responses to the request based on a matching rule; and excluding the request and the subset of responses when generating the packed candidates.

8. The non-transitory computer readable storage medium of claim 6, wherein computing permutations of responses from the plurality of responses comprises computing permutations less than a fixed permutation size.

9. The non-transitory computer readable storage medium of claim 6, wherein inputting the feature vectors into the ML model comprises inputting the feature vectors into a gradient-boosted decision tree.

10. The non-transitory computer readable storage medium of claim 6, the steps further comprising: transmitting the responses associated with the feature vector and the request to a user; receiving a response from the user, the response comprising one of a confirmation or rejection of the responses associated with the feature vector and the request; and using the response as a label during training of the ML model.

11. A device comprising:

a processor configured to:

retrieve a request and a plurality of responses;

filter the plurality of responses by removing responses having a field value that conflicts with a corresponding field value of the request;

generate packed candidates based on the request and the plurality of responses remaining after the filtering by iteratively computing permutations of responses from the plurality of responses until reaching a threshold number of permutations, a given packed candidate in the packed candidates comprising the request and a subset of the plurality of responses, wherein an aggregate value computed from a numerical field of the responses in the subset satisfies a condition of the request;

generate feature vectors corresponding to the packed candidates, a given feature vector in the feature vectors including at least one synthesized feature computed from fields of both the request and one or more corresponding responses in a respective packed candidate, the at least one synthesized feature comprising a computed temporal difference between a date associated with the request and dates associated with the one or more corresponding responses;

input the feature vectors into a machine learning (ML) model trained on previously labeled packed candidates, the ML model configured to output, for each of the feature vectors, a score representing a likelihood that the respective packed candidate accurately bundles the one or more corresponding responses with the request;

select a feature vector from the feature vectors having a highest score from the scores output by the ML model; and store responses associated with the feature vector and the request in a data storage device.

12. The device of claim 11, wherein generating the packed candidates comprises: matching a subset of responses to the request based on a matching rule; and excluding the request and the subset of responses when generating the packed candidates.

13. The device of claim 11, wherein computing permutations of responses from the plurality of responses comprises computing permutations less than a fixed permutation size.

14. The device of claim 11, wherein inputting the feature vectors into the ML model comprises inputting the feature vectors into a gradient-boosted decision tree.

\* \* \* \* \*